United States Patent [19]
Maxwell

[11] Patent Number: 6,139,738
[45] Date of Patent: Oct. 31, 2000

[54] CARTRIDGE FILTER WITH INTEGRATED THREADING HAVING ANTI-ROTATION FEATURE

[75] Inventor: Martin C. Maxwell, Ripon, Calif.

[73] Assignee: Parker-Hannifin Corporation, Cleveland, Ohio

[21] Appl. No.: 09/265,624

[22] Filed: Mar. 10, 1999

[51] Int. Cl.[7] .................................................. B01D 27/00
[52] U.S. Cl. .......................... 210/248; 210/440; 210/444; 210/483; 210/DIG. 17
[58] Field of Search .................................... 210/232, 238, 210/248, 435, 437, 440, 441, 443, 444, 497.01, DIG. 17, 483, 493.2

[56] References Cited

U.S. PATENT DOCUMENTS

| | | |
|---|---|---|
| 2,955,712 | 10/1960 | Gutkowski . |
| 3,680,706 | 8/1972 | Baer et al. . |
| 4,302,330 | 11/1981 | Cusato, Jr. . |
| 4,617,118 | 10/1986 | Smart . |
| 4,626,348 | 12/1986 | Stone . |
| 4,654,142 | 3/1987 | Thomsen et al. . |
| 4,668,393 | 5/1987 | Stone . |
| 4,692,245 | 9/1987 | Church et al. . |
| 4,740,299 | 4/1988 | Popoff et al. . |
| 4,764,275 | 8/1988 | Robichaud . |
| 4,997,555 | 3/1991 | Church et al. . |
| 5,035,797 | 7/1991 | Janik . |
| 5,154,823 | 10/1992 | Ma et al. . |
| 5,186,829 | 2/1993 | Janik . |
| 5,190,651 | 3/1993 | Spencer et al. . |
| 5,244,571 | 9/1993 | Church . |
| 5,560,824 | 10/1996 | Sam et al. . |
| 5,622,623 | 4/1997 | Stone . |
| 5,637,215 | 6/1997 | Albers, Jr. . |
| 5,738,785 | 4/1998 | Brown et al. . |
| 5,902,478 | 5/1999 | O'Ryan . |

*Primary Examiner*—David A. Simmons
*Assistant Examiner*—Fred Prince
*Attorney, Agent, or Firm*—Christopher H. Hunter

[57] ABSTRACT

A filter includes a casing enclosing a filter cartridge and a removable collection bowl. The filter cartridge includes a filter media ring with upper and lower end caps. The lower end cap of the filter cartridge has a ring-shaped member projecting axially downward. The ring-shaped member has an annular portion with radially inward-directed threads, whereby the collection bowl, with radially outward-directed threads, can be removably attached to the cartridge. The ring-shaped member further includes radial flow passages between the threads and the end cap, whereby contaminants may pass from a peripheral region of the filter element interiorly of the ring-shaped member and downwardly into the attached collection bowl. The filter includes an anti-rotation feature, comprising radially outward-directed keys, disposed circumferentially around the annular portion of the ring-shaped member and projecting radially-outward therefrom, and slots formed on the inside surface of the casing. The keys and slots rotationally fix the filter cartridge with respect to the casing when the cartridge is installed in the casing, such that the collection bowl can be threaded onto and off of the cartridge. The collection bowl and ring-shaped member trap a radially-inward directed portion of the casing and a resilient gasket to fluidly-seal the collection bowl to the cartridge.

25 Claims, 6 Drawing Sheets

CARTRIDGE FILTER WITH INTEGRATED THREADING HAVING ANTI-ROTATION FEATURE

FIELD OF THE INVENTION

The present invention relates generally to fluid filters, and more particularly to diesel fuel filters.

BACKGROUND OF THE INVENTION

Filters which separate out particulate matter from liquids, as well as liquid contaminants, are well-known in the industry. Such filters are particularly useful for diesel fuel, where water is removed from the diesel fuel passing through the filter to increase the combustion efficiency of the engine. Such fuel filters are also useful with gasoline, oil and other liquid fuels.

A number of such filters include cup-shaped collection bowls located below the filter media to collect the liquid contaminants. U.S. Pat. Nos. 4,626,348; 4,692,245; 4,740,299; 4,668,393; 4,997,555; 5,244,571; and 5,622,623 for example, all show and describe such filters, whereby a collection bowl with a threaded upper end is removably connected to the housing or casing of a filter cartridge. The filter cartridge includes a ring of appropriate filtration media bounded by upper and lower end caps. Particles in the fuel flowing through the filter media are separated out in the media, while the liquid contaminants collect on the surface of the media, and drop down into the attached collection bowl. The collection bowl is transparent to allow monitoring of the liquid level and includes a drain to allow removal of the liquid contaminants when appropriate.

As shown in U.S. Pat. No. 5,622,623, one technique for attaching the collection bowl to the cartridge is to include a ring-shaped member supported by a radially in-turned portion of the cartridge casing, where the ring-shaped member includes an annular portion with radially-outward directed threads. The collection bowl, with radially inward directed threads, is then easily screwed onto or off of the filter member. Radial flow passages in the ring-shaped member fluidly connect a peripheral cavity in the casing, that is, between the casing and the outer surface of the filter media, with the attached collection bowl, such that liquid contaminants can pass radially-inward through the passages and then downwardly into the attached collection bowl.

U.S. Pat. No. 4,740,299 shows a similar structure, whereby the ring-shaped member has radially-inward directed threads, and the collection bowl has radially-outward directed threads.

In some instances, the casing of the filter cartridge is designed to be spun onto a filter head, and includes an upper tap plate with a series of peripheral openings fluidly connected with the peripheral cavity, and a central opening fluidly connected with the central cavity of the element. The openings direct fluid into and out of the filter.

The above filters have received widespread acceptance in the marketplace as providing reliable, efficient devices for separating particles and liquid contaminants from fuel. Unfortunately, one of the limitations of some of the above filters is that the filter cartridge cannot be removed from the casing of the filter. This requires the entire filter cartridge and casing to be disposed of when the media is spent, which can raise environmental issues. The collection bowl is typically the only re-usable component as it can be screwed onto and off of the cartridge when the cartridge is replaced.

On the other hand, providing a filter where the cartridge can be easily removed from the casing also raises issues. For example, it is possible that an end user or repair person can forget to install or re-install a fresh cartridge, and thereby operate the engine without proper filtration. It can also be confusing as to the correct type of filter cartridge used in the filter, and a user or repair person may attempt to install an incorrect cartridge in the casing. This can all have a serious effect on the operation of the internal combustion engine.

Thus, it is believed there is a demand in the industry for a filter including a filter cartridge and attached collection bowl, whereby the filter cartridge is removable from the filter casing but where the filter cannot be assembled or used without a proper filter cartridge installed.

It is also believed there is a continual demand for new and unique filters with removable collection bowls which are easy and cost-effective to manufacture and assembly and provide efficient separation of particles and liquid contaminants in fuel flowing through the filter.

SUMMARY OF THE PRESENT INVENTION

The present invention provides a novel and unique filter, where a filter cartridge must be present within the casing of the filter in order that the collection bowl can be attached and the filter used in a fuel system. The filter cartridge must also have a special anti-rotation feature in order that the collection bowl can be screwed onto the cartridge. This allows control over the type of filter cartridge used within the filter and prevents the use of the filter without a cartridge. The filter is simple and cost-effective to manufacture and assemble, and provides efficient separation of particles and liquid contaminants from fuel passing through the cartridge.

According to the preferred embodiment of the present invention, the filter includes a casing enclosing a removable filter cartridge. The filter cartridge includes a ring of filter media circumscribing a central cavity and having upper and lower ends.

An upper end cap is adhesively bonded to the upper end of the filter media, and a lower end cap is adhesively bonded to the lower end of the filter media. A ring-shaped member unitary with the lower end cap projects axially downward and includes an annular portion with radially inward-directed threads. The annular portion of the ring-shaped member includes a lower end surface, and the casing includes a radially in turned lower end. The in-turned lower end of the casing engages and supports the lower end surface of the ring-shaped member.

A cup-shaped collection bowl is removably attached to the cartridge. The collection bowl includes outwardly-directed threads which cooperate with the threads on the ring-shaped member such that the bowl can be threaded onto and off of the cartridge. The collection bowl also includes a radially outward-projecting shoulder beneath the threads, which when the collection bowl is threaded onto the ring-shaped member, engages the in-turned lower end of the casing to trap the lower end of the casing between the collection bowl and the ring-shaped member. A resilient gasket is provided between the shoulder of the collection bowl and the in-turned lower end of the casing to ensure a fluid-tight seal.

The annular portion of the ring-shaped member includes radial flow passages between the threads and the lower end cap to allow contaminants to pass inwardly through the ring-shaped member from the peripheral cavity around the cartridge and then downwardly into the attached collection bowl. To prevent the ring-shaped member, and hence the cartridge, from rotating in the casing when the collection bowl is screwed on, the ring-shaped member includes at least one anti-rotation device disposed circumferentially around the annular portion and projecting radially outward therefrom. The anti-rotation device on the cartridge cooperates with at least one anti-rotation device on the casing to prevent the cartridge from rotating in the casing. Preferably, the anti-rotation device on the cartridge includes a plurality of keys and the anti-rotation device on the casing includes a plurality of slots, with the keys being configured to be closely received in the slots so that only a proper cartridge (with the appropriate efficiency, media, size, etc.) can be installed within the filter.

The casing of the filter is removably attached to a filter head connected within the fuel system. The casing and filter head have corresponding threaded portions to allow the casing to be threaded onto or off of the filter head, and thereby provide access to the filter cartridge in the casing. The filter cartridge can thereby be easily installed into the casing, and removed from the casing when spent.

The collection bowl can only be installed on the filter after an appropriate filter cartridge is installed within the filter casing. If a filter cartridge is missing, there is no threaded portion to allow attachment of the collection bowl. Similarly, if the keys on the cartridge do not match the slots on the ring-shaped member, the cartridge will not fit correctly in the casing and the collection bowl likewise cannot be attached. Still, further, if the cartridge is present but does not include the anti-rotation keys, the cartridge will rotate as the user attempts to screw on the collection bowl, thus also preventing the bowl from being attached. This all prevents the filter from being used without an appropriate filter cartridge, or if the cartridge is absent from the filter.

As such, the present invention provides a novel and unique filter, which includes a filter casing with a removable filter cartridge, and a removable collection bowl. The filter requires a filter cartridge to be present the filter in order that the collection bowl can be attached and the filter used, and provides control over the type of filter cartridge located in the filter. The filter is simple and cost-effective to manufacture and assemble, and provides efficient separation of particles and liquid contaminants from fuel in the fuel system.

Further features and advantages of the present invention will become apparent to those skilled in the art upon reviewing the following specification and attached drawings.

DETAILED DESCRIPTION OF THE PREFERRED EMBODIMENT

Figure 1:
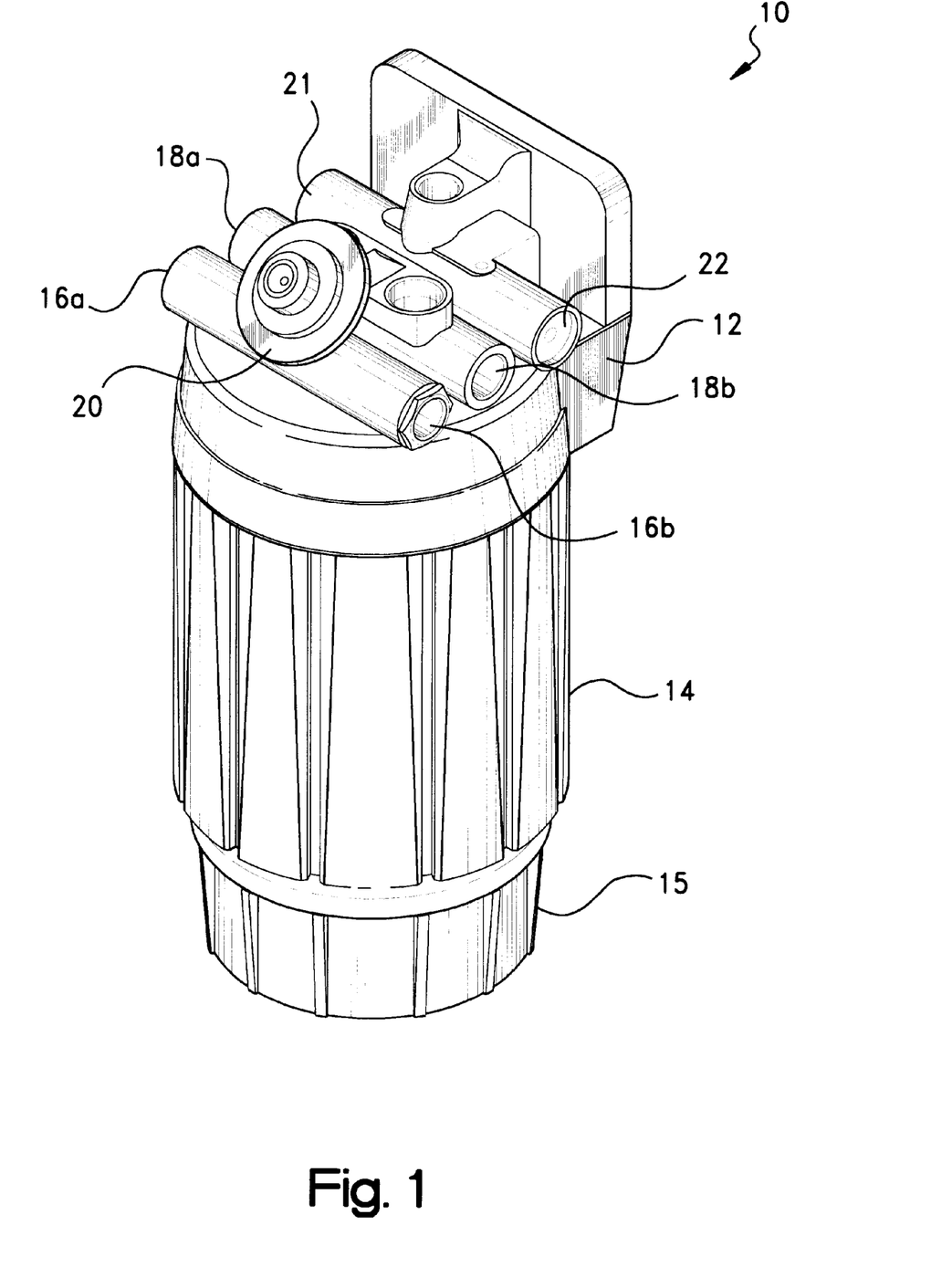
FIG. 1 is an elevated perspective view of a filter constructed according to the principles of the present invention.

Referring to the drawings, and initially to FIG. 1, a filter constructed according to the principles of the present invention is indicated generally at 10. The filter 10 includes a filter head or manifold 12, a removable casing 14, and a removable collection bowl 15.

The filter head 12 includes inlet passages 16a, 16b (from e.g., the tank) and outlet passages 18a, 18b (to e.g., a transfer pump and then to the fuel injectors) for directing fuel into and out of the filter. One of inlet passages 16a, 16b and one of outlet passages 18a, 18b is used depending upon the plumbing of the system. The other of the passages 16a, 16b is typically plugged. Inlet passages 16a, 16b provide fuel to be filtered to the peripheral region of the casing, while outlet passages 18a, 18b draw filtered fuel from the central region of the casing.

A primping pump 20 is provided in the inlet passages 16a, 16b to push fuel through the filter after an element change. Further details of a priming pump 20 appropriate for the present invention can be found in U.S. Pat. No. 5,362,392. The filter head 12 further includes a return inlet passage 21 receiving excess (unburned) fuel from the engine to be directed again through the filter; and a return outlet passage 22, which directs the remainder of the excess fuel back to the tank. A temperature sensor, vacuum switch and pressure sensor can be mounted in the inlet, outlet and/or return passages for appropriate control and sensing of the fuel flowing through the filter head.

Figure 2:
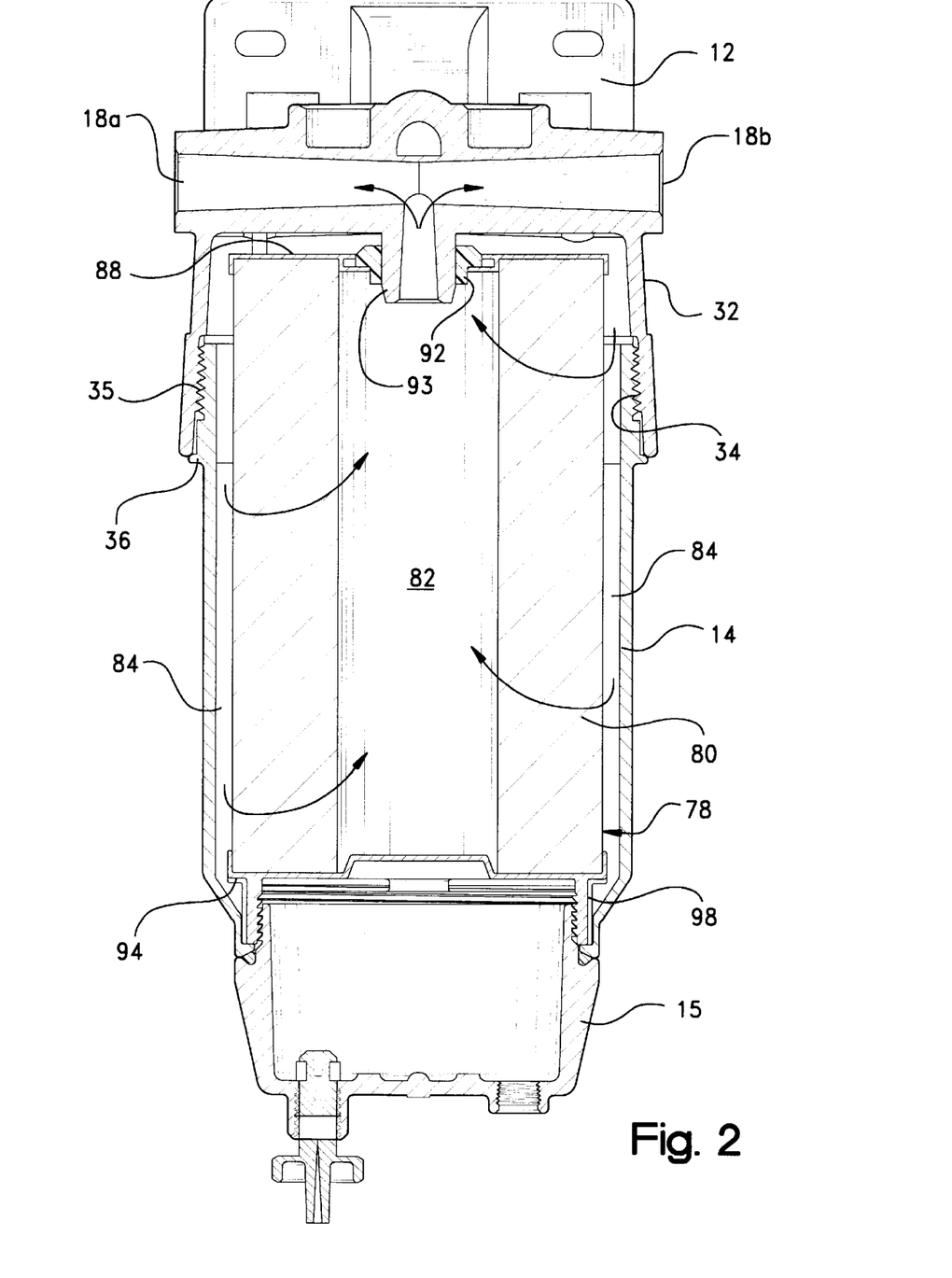
FIG. 2 is a cross-sectional side view of the filter of FIG. 1 showing a filter cartridge in the filter.

Referring now to FIG. 2, filter head 12 further includes a cylindrical attachment collar 32 extending axially downward and including a series of radially-inward directed threads 34. Casing 14 includes a series of cooperating radially-outward directed threads 35 which enable the casing to be screwed onto and off of the filter head. Casing 14 further includes a radially-outward directed annular flange 36 serving as a stop for collar 32, as well as for sealing the casing to the filter head. An O-ring 37 (FIG. 3) can be provided between the collar 32 and casing 14 to ensure a fluid-tight seal between the head and casing.

Filter head 12 is preferably formed from an appropriate material suitable for the particular application, for example metal, and is formed using conventional techniques, such as die-casting.

Figure 4:
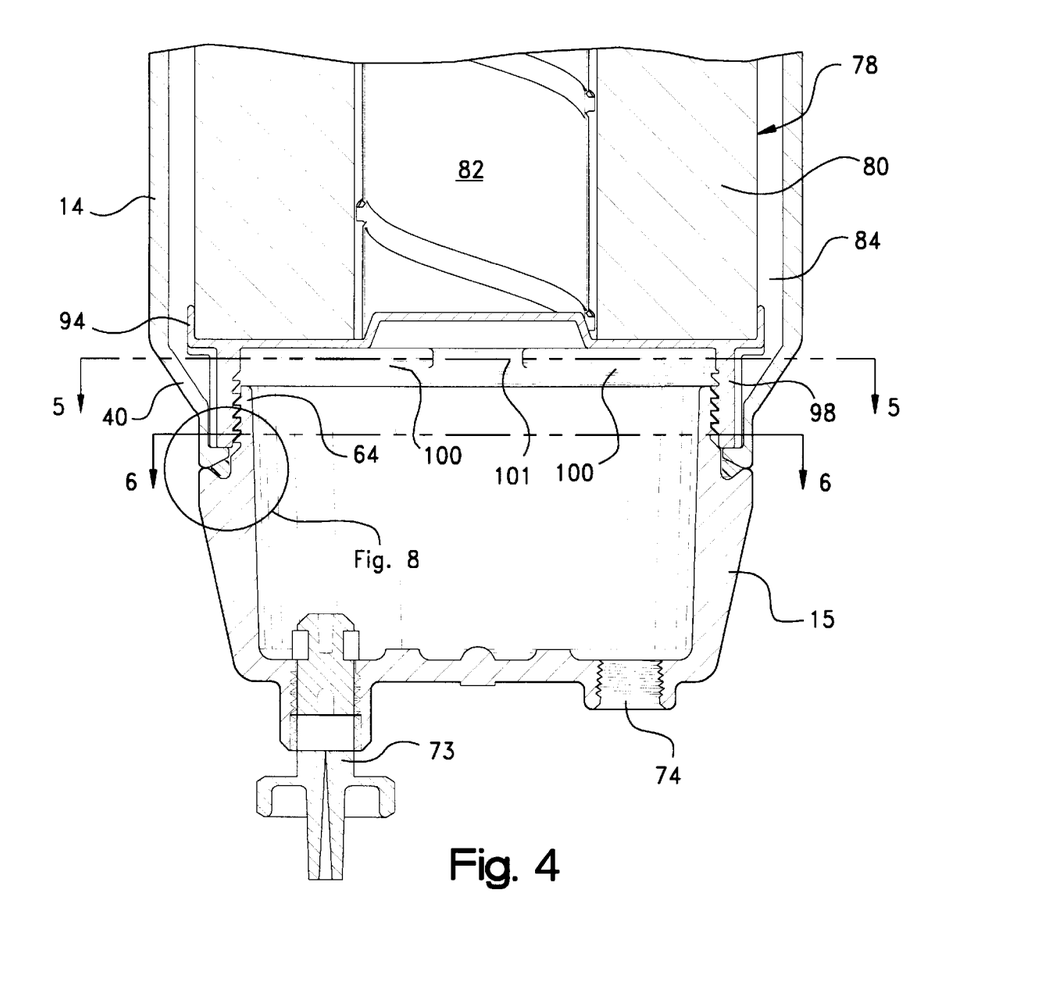
FIG. 4 is an enlarged, partially cross-sectioned view of a portion of the filter.
Figure 5:
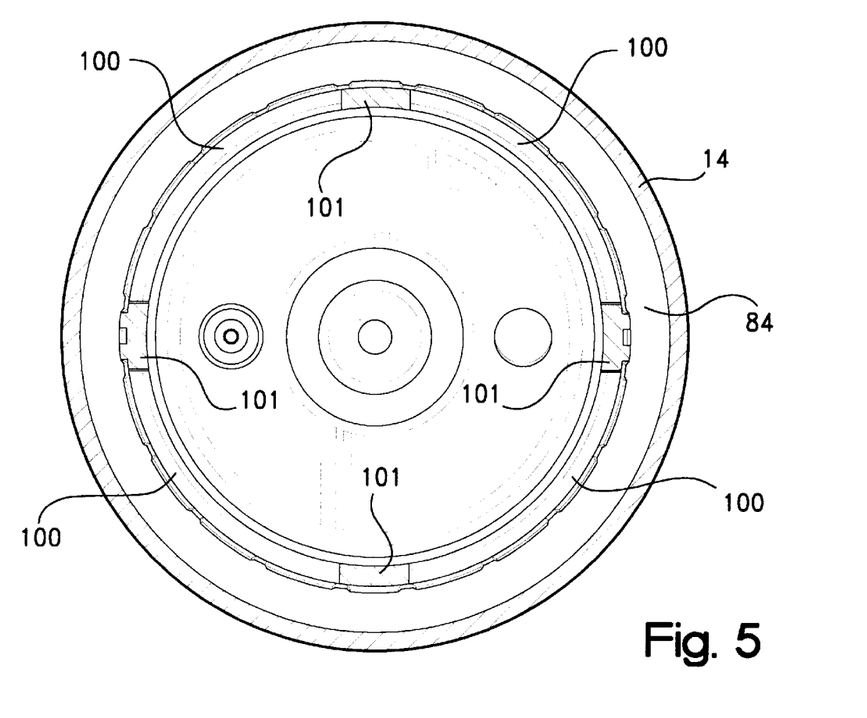
FIG. 5 is a cross-sectional end view of the filter taken substantially along the plane defined by the lines 5—5 of FIG. 4.
Figure 8:
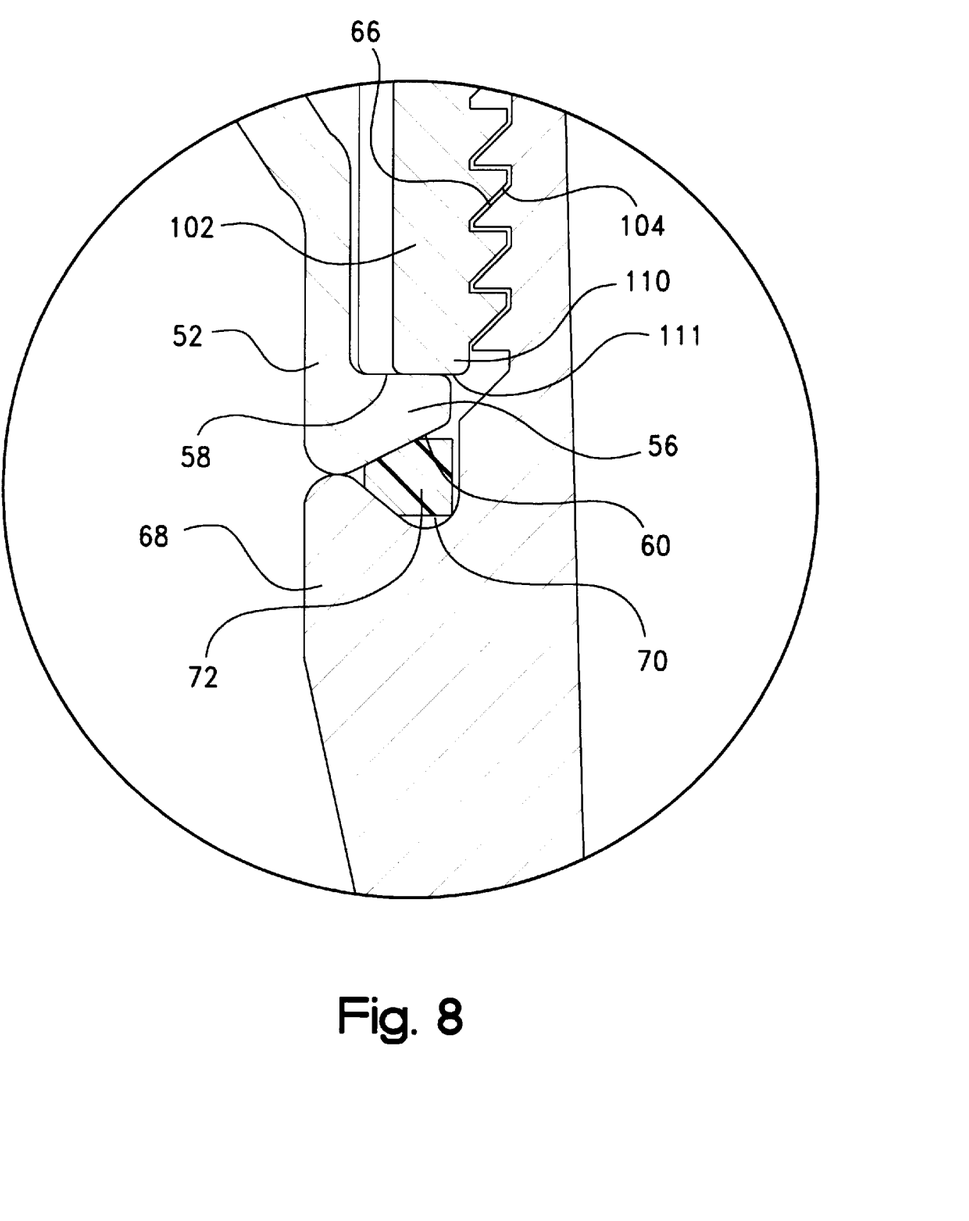
FIG. 8 is a cross-sectional enlarged view of a portion of the filter of FIG. 4.

Referring now to FIGS. 4 and 8, the casing 14 has a generally cylindrical configuration with an inwardly-tapered portion 40 at the lower end terminating in a cylindrical portion 52. Cylindrical portion 52 has a radially inward-directed lip 56 which includes an upper annular surface 58 and a lower frustoconical (angled) sealing surface 60.

Casing 14 is also preferably formed of a material which is appropriate for the particular application, for example, a hard opaque plastic.

Collection bowl 15 has a cup-shape with an upper annular portion 64 with a series of radially-outward directed threads 66. The upper annular portion 64 also includes an annular, radially-outward projecting shoulder 68 beneath the threaded portion; and an annular groove 70 in shoulder 68 which is dimensioned to receive a resilient gasket 72.

A drain 73 is provided in the lower end of collection bowl 15 to allow removal of water contaminants; and a water probe (not shown) can be located in opening 74 for sensing the collection of water. The drain 73 and water probe are preferably conventional components. Collection bowl 15 is also preferably formed of a material which is appropriate for the particular application, for example, a hard transparent plastic.

Figure 3:
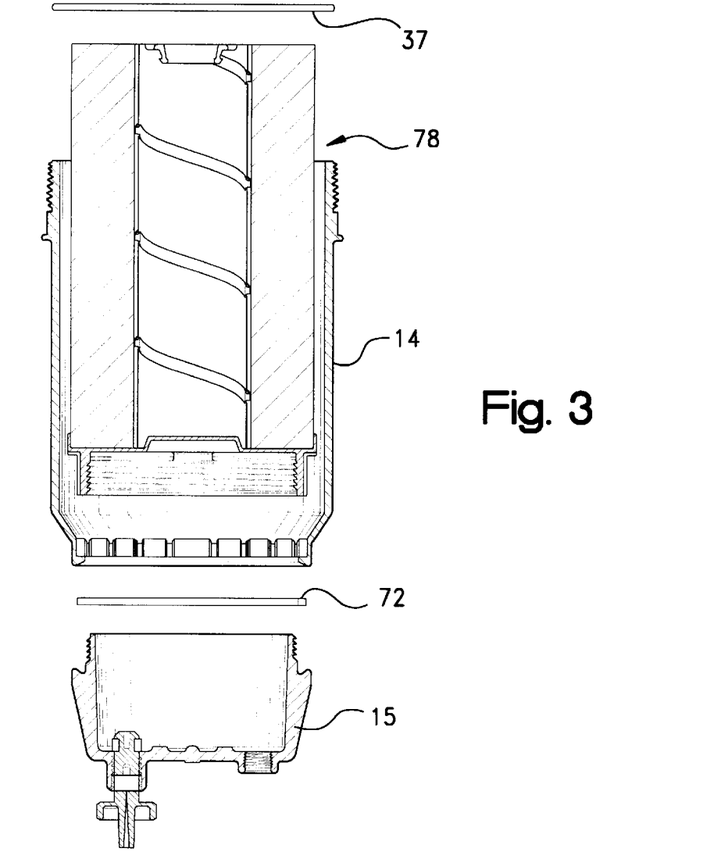
FIG. 3 is an exploded view of the components of the filter of FIG. 1.

Referring now to FIGS. 2–4, filter 10 also includes a filter cartridge, indicated generally at 78, removably disposed within casing 14. Filter cartridge 78 includes a media ring 80 formed of an appropriate filtration media and may include other appropriate structure (e.g., a perforated support core) for the particular application. Media ring 80 preferably has a tubular or cylindrical form, circumscribing a central axis and defining a central cavity 82, and together with casing 14, defining a peripheral cavity 84. As indicated previously, inlet passages 16a, 16b direct fuel to be filtered into peripheral cavity 84, while outlet passages 18a, 18b direct filtered fluid out of the central cavity 82. A first end cap 88 is sealingly bonded such as by adhesive or other appropriate means to the upper end of media ring 80. Upper end cap 88 has an imperforate annular configuration with a central circular opening and a resilient annular sealing member 92 retained in the opening. Sealing member 92 is dimensioned to receive and seal against passage 93 of filter head 12 when the cartridge is located within the filter. Passages 93 is in fluid communication with both outlet passages 18a, 18b.

Figure 7:
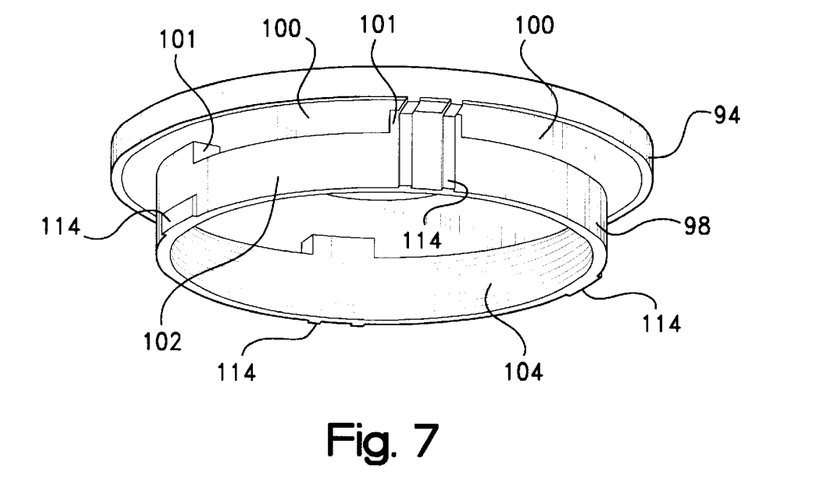
FIG. 7 is a perspective view of the lower end cap assembly for the filter cartridge of FIG. 2.

Filter element 78 further includes a second end cap 94 also sealingly bonded such as with adhesive or by other appropriate means to the lower end of media ring 80. Lower end cap 94 has an imperforate circular configuration and prevents fuel flow directly from the peripheral chamber to the central chamber (i.e., without passing through the filter media). A ring-shaped member 98 is preferably formed in one piece (unitary) with the lower end cap 94 and extends axially downward therefrom. As illustrated in FIG. 7, a plurality of arcuately-extending flow slots or openings 100 are spaced evenly around the circumference of the ring-shaped member 98, adjacent to the lower end cap 94. Flow slots 100 are designed to allow liquid contaminants to flow radially-inward through the ring-shaped member 98 from the peripheral cavity 84 and then downwardly into to the collection bowl 15. Axial posts 101 connect the ring-shaped member 98 to end cap 94, and define the openings 100 in the lower end cap. Preferably, four such posts defining four flow slots are provided, however, this can vary depending upon the particular application.

Referring also to FIGS. 4 and 8, the ring-shaped member 98 further includes an annular portion 102 with radially inward-directed threads 104, below flow openings 100. Threads 104 cooperate with threads 66 of collection bowl 15 to enable the collection bowl 15 to be removably connected to the ring-shaped member 98. As can be seen in FIG. 4, flow passages 100 remain fully open when the collection bowl 15 is connected to the ring-shaped member 98.

Figure 6:
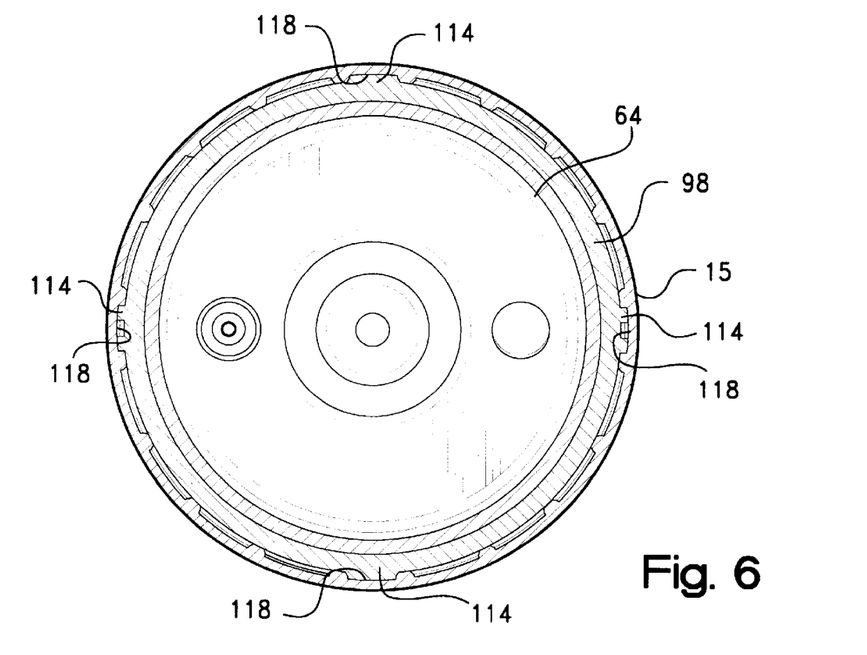
FIG. 6 is a cross-sectional end view of the filter taken substantially along the plane described by the lines 6—6 of FIG. 4.

Referring now to FIGS. 6–8, the ring-shaped member 98 includes a lower end 110 having a flat annular surface 111. The lower end 110 is dimensioned to be received within the lower cylindrical portion 52 of casing 40, with surface 111 flush against surface 58 of the radially in-turned lip 56.

To prevent element 78 from rotating with respect to casing 14 when the collection bowl is screwed onto the ring-shaped member, an anti-rotating feature is provided in the filter. The anti-rotation feature includes at least one anti-rotation device on the ring-shaped member which cooperates with a corresponding anti-rotation device on the casing 14. The anti-rotation device on the ring-shaped member preferably comprises a plurality of tabs or keys 114 evenly spaced around a radially-outer surface of the ring-shaped member 98, and projecting radially-outward therefrom. The anti-rotation device on the casing preferably includes axially-extending grooves or slots 118 formed circumferentially around the inside surface of casing 40. The keys 114 on the ring-shaped member are closely received in the slots in the casing when the cartridge is installed in the casing.

As illustrated, four such keys 114 are received in four (of twenty) of such slots 118. The dimensions of the slots 118 will generally be determined by the dimensions of the keys 114, with the slots closely receiving the keys to prevent any significant relative rotational movement of the cartridge with respect to the casing. The slots 118 generally extend axially along at least the cylindrical portion 52 of the casing 14, and it is preferred that there are more slots than keys to facilitate assembling the cartridge in the casing, although at a minimum, only a single key and slot are necessary. The keys 114 are shown as being confined primarily to the lower end of the ring-shaped member, however the keys could extend axially across a more significant portion (or the entire portion) of the ring-shaped member 98.

Preferably, the keys 114, ring-shaped member 98, and lower end cap 94 are formed together in one piece (unitary) with each other, such as by molding or stamping. Although less preferred, it is possible that these components could be formed separately and then later attached in an integral manner, such as with adhesive.

The number and location of keys 114 and slots 118 can vary depending upon the particular filter cartridge and casing. This allows the filter cartridges to be identified with a particular filter casing, to prevent inadvertently locating a filter cartridge of an incorrect efficiency, rating, size, etc. within a casing. Filter cartridges having one key configuration can be designed for filter casings of one slot configuration, while filter cartridges of another key configuration can be designed for filter casings of another slot configuration. In addition, while the keys are shown formed with the cartridge and the slots are shown with the casing, this could be reversed, that is, with the keys on the casing, and the slots on the cartridge, to achieve the same result. Moreover, while keys and slots are shown, it should be appreciated that other anti-rotation devices could also be provided between the cartridge and casing to prevent the filter cartridge from rotating with respect to the casing.

In assembling the filter, the filter cartridge 78 is initially located within casing 14, with the ring-shaped member 98 supported against the radially in-turned lip 56. Keys 114 slide easily into slots 118 until the lower end 110 of ring-shaped member 98 bottoms against surface 58 of the radially in-turned lip 56. Next, collection bowl 15 (with gasket 72) is screwed onto the ring-shaped member 98. The cartridge is prevented from rotating in the casing by the keys 114 and slots 118, such that the collection bowl can be fully tightened on the ring-shaped member. As can be most clearly seen in FIG. 8, when the collection bowl 15 is completely tightened down onto the ring-shaped member 98, the radially in-turned lip 56 is trapped between shoulder 68 of collection bowl 15 and the lower end 100 of the ring-shaped member. At the same time, gasket 72 is compressed within groove 70 to provide a fluid-tight seal between the collection bowl and the casing.

Should a filter cartridge be absent, there will be no means for attaching the collection bowl to the filter, and the filter will in effect be unusable. Further, if a cartridge without any anti-rotation feature is used in the filter, the cartridge will rotate as it is attempted to screw on the collection bowl, also effectively preventing the use of the filter. Still further, if a filter cartridge having an incorrect configuration of keys for the slots is used, the keys will not fit properly into the slots, and the cartridge will not slide in axially far enough such that the threads on the ring-shaped member will be accessible to the threads on the collection bowl. This will also prevent the attachment of the collection bowl, and hence the use of the filter.

On the other hand, when an appropriate filter cartridge having a correct configuration of keys is inserted into the casing, the collection bowl can be easily threaded onto the cartridge. The casing and filter head can then be easily attached together and the engine operated with the proper filtration of fuel.

During operation of the filter, the fuel enters one of inlet passages 16a, 16b, is directed into peripheral cavity 84, and flows radially inward through media 80 where particles in the fuel are separated. The filtered fuel than flows out through one of the outlet passages 18a, 18b. Liquid contaminants are collected on the outer surface of the media, and pass downwardly and inwardly through openings 100 into the attached collection bowl 15.

To remove a spent filter cartridge, the filter is first drained of fuel, and the above procedure is reversed, where the filter cartridge 14 is screwed off the filter head 12, and the collection bowl 15 is screwed off of the ring-shaped member 98. The filter element 78 can then removed from casing 14 and replaced with a fresh element.

Thus, as described above, the present invention provides a novel and unique filter having a removable cartridge in a casing, and a removable collection bowl, which requires a specific filter cartridge to be installed within the filter, and which cannot be used if the filter cartridge is absent.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter cartridge, comprising:
   a ring of filter media circumscribing a central cavity and having upper and lower ends,
   an upper end cap sealingly engaging the upper end of the filter media, and a lower end cap with an upper surface sealingly engaging the lower end of the filter media, and a ring-shaped member attached to and projecting axially downward away from a lower surface of the second end cap, said ring-shaped member having an annular portion with threads whereby a collection bowl with threads can be removably connected to the ring-shaped member, said ring-shaped member further including radial flow passages whereby contaminants may pass from a peripheral region of said filter cartridge interiorly of said ring-shaped member and downwardly into the attached collection bowl; and said ring-shaped member further including an anti-rotation device disposed on the annular portion, whereby said anti-rotation device can mate with a corresponding anti-rotation device on a casing to rotationally fix the filter cartridge with respect to the casing, wherein said anti-rotation device on said annular portion comprises at least one radially-outward projecting key disposed on a radially-outer surface of the annular portion.

2. The filter cartridge as in claim 1, wherein said anti-rotation device on said annular portion comprises a plurality of radially-outward projecting keys disposed around a radially-outer surface of the annular portion.

3. The filter cartridge as in claim 2, wherein said keys are circumferentially spaced-apart from one other around the annular portion.

4. The filter cartridge as in claim 3, wherein the flow passages are provided axially between the threads on the annular portion and the lower surface of the lower end cap.

5. The filter cartridge as in claim 1, wherein said upper end cap is adhesively bonded to said upper end of the filter ring, and includes a central opening into the central cavity.

6. The filter cartridge as in claim 1, wherein said lower end cap is adhesively bonded to said lower end of the filter ring, and includes a central imperforate portion preventing fluid flow into the central cavity.

7. The filter cartridge as in claim 1, wherein said ring-shaped member and said lower end cap are unitary with each other.

8. A filter subassembly including a filter cartridge as in claim 1, and further including a cylindrical casing removably receiving the filter cartridge, said casing including an anti-rotation device disposed on an inside surface of the casing and cooperating with the anti-rotation device of the annular portion to rotationally fix the filter cartridge with respect to the casing.

9. The filter subassembly as in claim 8, and further including a collection bowl with threads removably connected to the ring-shaped member.

10. A filter cartridge removably positionable within a cylindrical casing having anti-rotation slots disposed circumferentially around an inside surface of the casing, the filter cartridge comprising:
    a ring of filter media circumscribing a central cavity and having upper and lower ends,
    an upper end cap with a first surface bonded to the upper end of the filter media, and
    a lower end cap with a first surface bonded to the lower end of the filter media, and a ring-shaped member projecting axially downward, away from a second surface of the second end cap, said ring-shaped member having an annular threaded portion whereby a collection bowl with threads can be removably attached to the filter element; said ring-shaped member further including flow passages between said threads and said second surface whereby contaminants may pass from a peripheral region of said filter cartridge interiorly of said ring-shaped member and downwardly into the attached collection bowl; and said ring-shaped member further including a plurality of anti-rotation keys disposed circumferentially around the annular portion, whereby said anti-rotation keys can mate with the anti-rotation slots on the casing to rotationally fix the filter cartridge with respect to the casing.

11. The filter cartridge as in claim 10, wherein said keys are circumferentially spaced-apart from each other around a radially-outer surface of the annular portion, and project radially outward therefrom.

12. The filter cartridge as in claim 10, wherein said ring-shaped member and said lower end cap are unitary with each other.

13. A filter subassembly, comprising:
    a cylindrical casing having a radially in-turned lower end with anti-rotation devices disposed circumferentially around an inner surface of the casing toward the lower end,
    a collection bowl for attachment to the lower end of the casing, said collection bowl including a cup-shaped body and an annular threaded portion, and
    a filter cartridge removably disposed within the casing, said filter cartridge including a ring of filter media separating a central cavity from a peripheral cavity in the casing and having upper and lower ends, an upper end cap with a first surface sealingly engaging the upper end of the filter media, and a lower end cap with a first surface sealingly engaging the lower end of the filter media, a ring-shaped member attached to and projecting axially downward, away from a second surface of the second end cap and supported by the in-turned lower end of the casing, said ring-shaped member having an annular threaded portion removably receiving the threads of the collection bowl; and said ring-shaped member further including flow passages between said threaded portion and said second surface whereby contaminants may pass from the peripheral cavity interiorly of said ring-shaped member and downwardly into the attached collection bowl; and said ring-shaped member further including a plurality of anti-rotation devices disposed circumferentially around the annular portion and projecting radially-outward therefrom, said anti-rotation devices of said ring-shaped member mating with the anti-rotation devices on the casing to rotationally fix the filter cartridge with respect to the casing when the collection bowl is screwed onto the ring-shaped member.

14. The filter subassembly as in claim 13, wherein the annular portion of the ring-shaped member includes a lower end surface, and the in-turned lower end of the casing includes an upper end surface, the upper end surface of the in-turned lower end engaging and supporting the lower end surface of the ring-shaped member.

15. The filter subassembly as in claim 14, wherein the annular portion of the collection bowl includes a radially-outward projecting shoulder between the body of the collection bowl and the threads, the shoulder of the collection bowl engaging the in-turned lower end of the casing to trap the in-turned lower end of the casing between the collection bowl and the ring-shaped member.

16. The filter subassembly as in claim 15, further including a resilient gasket carried within an annular groove formed in the shoulder of the collection bowl, the gasket being compressed between the lower end of the casing and the collection bowl.

17. The filter subassembly as in claim 13, wherein said anti-rotation devices on said annular portion comprise a plurality of radially-outward projecting keys.

18. The filter subassembly as in claim 17, wherein said keys are circumferentially spaced-apart from each other around a radially-outer surface of the annular portion.

19. The filter subassembly as in claim 13, wherein said upper end cap is adhesively bonded to said upper end of the filter ring, and includes a central opening into the central cavity.

20. The filter subassembly as in claim 13, wherein said lower end cap is adhesively bonded to said lower end of the filter ring, and includes a central imperforate portion preventing fluid flow into the central cavity.

21. The filter subassembly as in claim 13, wherein said ring-shaped member and said annular portion of said lower end cap are unitary with each other.

22. A filter assembly including a filter subassembly as in claim 12, and a filter head having inlet and outlet passages for connection within a fluid system, said filter head being removably attached to the casing.

23. The filter assembly as in claim 22, wherein said filter head includes a cylindrical attachment portion, said cylindrical attachment portion of said filter head and said casing being removably connectable to each other to allow said filter cartridge to be positioned within said casing, and removed therefrom when the filter cartridge is spent.

24. A filter cartridge removably positionable within a cylindrical casing having an anti-rotation device disposed on an inside surface of the casing, the filter cartridge comprising:

a ring of filter media circumscribing a central cavity and having upper and lower ends, an upper end cap with a first surface bonded to the upper end of the filter media, and a lower end cap with a first surface bonded to the lower end of the filter media, and a ring-shaped member projecting axially downward, away from a second surface of the second end cap, said ring-shaped member having an annular threaded portion whereby a collection bowl with threads can be removably attached to the filter element; said ring-shaped member further including flow passages between said threads and said second surface whereby contaminants may pass from a peripheral region of said filter cartridge interiorly of said ring-shaped member and downwardly into the attached collection bowl; and said ring-shaped member further including radially outward projecting key means for cooperating with the anti-rotation device on the casing to rotationally fix the filter cartridge with respect to the casing.

25. The filter cartridge as in claim 24, wherein said radially outward projecting key means comprises a plurality of radially outward projecting key means.

* * * * *